United States Patent [19]

Schulz et al.

[11] Patent Number: 5,872,074
[45] Date of Patent: Feb. 16, 1999

[54] LEACHED NANOCRYSTALLINE MATERIALS PROCESS FOR MANUFACTURE OF THE SAME, AND USE THEREOF IN THE ENERGETIC FIELD

[75] Inventors: Robert Schulz; Guy Lalande; Jacques Huot; Marie-Chantal Denis; Guoxian Liang; Andrë Van Neste; Daniel Guay; Jean-Pol Dodelet, all of Quebec, Canada

[73] Assignee: Hydro-Quebec, Montreal, Canada

[21] Appl. No.: 788,301

[22] Filed: Jan. 24, 1997

[51] Int. Cl.$^6$ .............................. B01U 23/58; B22F 1/00; C22C 38/08; H01M 4/86

[52] U.S. Cl. .............................. 502/328; 502/335; 502/2; 502/523; 502/527; 75/300; 75/352; 148/33.2; 148/336; 148/426; 204/290 R; 204/290 F; 204/293; 429/40; 429/44; 420/900

[58] Field of Search ..................................... 502/328, 335, 502/2, 523, 527; 75/300, 352; 148/33.2, 336, 426; 204/290 R, 290 F, 293; 429/49, 44; 420/900

[56] References Cited

U.S. PATENT DOCUMENTS 5,433,797  7/1995  Erb et al. ................................ 148/304

FOREIGN PATENT DOCUMENTS 0 734 765 A1  10/1996  European Pat. Off. .
35 05 024 A  8/1986  Germany .
WO 96/23906  8/1996  WIPO .

OTHER PUBLICATIONS

Chen Y et al. "Production of Rutile from Ilmenite by Room Temperature Ball–Milling–Induced Sulphurisation Reaction", Journal of Alloys and Compounds, vol. 245, No. Jan. 2, pp. 54–58.

Jackson, E. "Hydrometallurgical Extraction and Reclamation", Ellis Horwood Ltd., England, 1986, pp. 56–73 and 190–197.

Ivanov E. et al. "Structural and Magnetic Properties of Non–Equilibrium B.C.C. Nickel Prepared by Leaching of Mechanically Alloyed NI35AL65", Journal of Alloys and Compounds, vol. 185, no. 1, pp. 25–34.

Database WPI, Section Ch, Week 9514, Derwent Publications Ltd., London, GB; Class A41, AN 95–101179 (Abstract of JP 7–024318A (Jan. 27, 1995)).

*Primary Examiner*—Elizabeth D Wood
*Attorney, Agent, or Firm*—Foley & Lardner

[57] ABSTRACT

Leached nanocrystalline materials having a high specific surface are particularly useful for storing hydrogen or as catalysts or electrocatalysts in the manufacture electrodes, especially for fuel cells. Such materials can be manufactured by preparing a nanocrystalline material consisting of a metastable composite or alloy of at least two different chemical elements. To be nanocrystalline, this material must have a crystalline structure with the grain size lower than 100 nm. Then, the so prepared nanocrystalline material can be subjected to a leaching treatment in order to eliminate partially or totally one of the elements of the composite or alloy. This leaching results in nanocrystalline materials having a porous structure and, thereby, the requested high specific surface.

20 Claims, 10 Drawing Sheets

LEACHED NANOCRYSTALLINE MATERIALS PROCESS FOR MANUFACTURE OF THE SAME, AND USE THEREOF IN THE ENERGETIC FIELD

FIELD OF THE INVENTION

The present invention relates to nanocrystalline materials with a high specific surface area.

The invention also relates to a process for the manufacture of such nanocrystalline materials, comprising the preparation of a composite or alloy of nanocrystalline structure, followed by a leaching of this composite or alloy.

The invention further relates to a method of use of such nanocrystalline materials having a high specific surface in the energetic field, and more particularly for the storage of hydrogen and/or the manufacture of catalysis or electrocatalysis electrodes, like those used in fuel cells or for the production of hydrogen.

Last of all, the invention relates to composites and alloys of nanocrystalline structure, which are useful as intermediate products in the above process.

In the following description, the expression "nanocrystalline" designates any material which is of crystalline structure and whose crystallites have a grain size lower than 100 nm.

TECHNICAL BACKGROUND

It is known that composites or alloys of nanocrystalline structure can be prepared by intense mechanical grinding, by crystallization of an amorphous precursor material obtained by quenching, or by condensation in vapor phase. By way of examples of manufacture of alloys by intensive mechanical grinding, reference can be made to international laid-open patent application No. WO-A-96/23906 and to European laid-open patent application No. EP-A-671,357.

If the nanocrystalline alloys that are so-obtained by mechanical grinding have some advantages, they usually have a specific surface area lower than 1 m$^2$/g. Such makes them inefficient for some very specific application where a high specific surface area is required, as is, for example, the case to obtain good catalysis or electrocatalysis results.

It is also known that one may obtain materials with a high specific surface area by leaching conventional alloys containing, in their structure, a leachable chemical element. Thus, for example, it is known that leaching of a NiAl alloy permits to obtain Raney Ni of high specific surface area. However, for thermodynamic reasons, this technology is restricted to a very small number of compounds of very specific composition and structure.

SUMMARY OF THE INVENTION

The present invention is based on the discovery that the two technologies mentioned hereinabove can be combined with success.

More particularly, it has been discovered that, by preparing nanocrystalline materials made of metastable alloys or composites and by subjecting these nanocrystalline materials to a leaching in a liquid or gaseous phase, one may prepare new metastable nanocrystalline materials having a very high specific surface area that makes them very useful and efficient, especially in the energetic field.

Therefore, a first object of the present invention is to provide a process for the manufacture of nanocrystalline materials having a high specific surface, are equal to or higher than 2 m$^2$/g comprising the steps of:

(1) preparing a nanocrystalline material consisting of a metastable composite or alloy of at least two different chemical elements, this material having a crystalline structure with a grain size lower than 100 nm; and (2) subjecting the so prepared nanocrystalline material to a leaching treatment in order to eliminate partially or totally at least one of the elements of the composite or alloy, said leaching giving to the resulting nanocrystalline material a porous structure and, thereby, the requested high specific surface.

A second object of the present invention lies in the nanocrystalline materials that are so manufactured. Such materials have a crystalline structure with a grain size lower than 100 nm and a specific surface area equal to or higher than 2 m$^2$/g and preferably higher than 10 m$^2$/g.

A third object of the invention is to provide method of use of these new nanocrystalline materials in the energetic field.

When these nanocrystalline materials comprise at least one phase or chemical element known to absorb hydrogen in a reversible manner, they can be used for storing hydrogen. Their high specific surface area substantially improve their absorption/desorption kinetics.

When the nanocrystalline materials comprise at least one chemical element known to be useful as a catalyst or electrocatalyst, they can be used for the manufacture of electrodes. Their high specific surface area substantially improves their efficiency.

A fourth and last object of the invention is to provide nanocrystalline materials that are useful as intermediates for the manufacture of the nanocrystalline materials according to the invention.

More particularly, in accordance with the invention, intermediates are provided for use in the manufacture of nanocrystalline materials which are themselves useful for the manufacture of electrodes. These intermediates have a nanocrystalline structure with a grain size lower than 100 nm and are in the form of a composite or alloy made of:

A—X—Y wherein:

A is Pt, Ru or a Pt or Ru compound;

X is at least one element selected from the group consisting of Ru, Ge, Si, W, Sn, Ga, As, Sb, Mo, Ti, Ta, Cr, Mn, Fe, Co, Ni, Cu, Rh, V, Pd, Ag, In, Os, Ir, Au, Pb, C, Cd, N, P, Bi, Nb and Zr; and Y is at least one element selected from the group consisting of Al, Mg, Zn, Li, Na, K, Ca, Zr, Ti, Mo and oxides thereof (these elements are leachable with an acid or a base in a liquid phase); or Y is U (this element is leachable by anodic polarisation); or Y is at least one element selected from the group consisting of H, C, N, O, F, Cl, P and S (these elements are leachable in a gaseous phase); or Y is a combination of a plurality of elements Y as defined hereinabove.

As can be noticed, some definitions of X and Y overlap. From practical standpoint, the respective amounts of A, X and Y may vary within large ranges and depend essentially on the intended use or need.

In accordance with the invention, other intermediates are provided for the use in the manufacture of nanocrystalline materials which are themselves useful for storing hydrogen. These intermediates have a nanocrystalline structure with a grain size lower than 100 nm and are in the form of a composite alloy made of:

A—X'—Y' wherein:

A' is Mg, Be or a Mg or Be compound;

X' is at least one element selected from the group consisting of Li, Ca, Ti, V, Cr, Mn, Fe, Co, Ni, Cu, Zn, Y, Zr, Nb, Mo, In, Sn, O, B and F; and Y' is at least one element leachable in a liquid phase, which is selected from the group consisting of Al, Mg, Zn, Li, Na, K, Ca, Zr, Ti, Mo and oxides thereof; or Y' is at least one element leachable in a gaseous phase which is selected from the group consisting of H, C, N, O, F, Cl, P and S; or Y' is an organometallic compound in which the metallic element is one of the metals listed in the definition of X' or a metal selected from the group consisting of Ru, Rh, Pd, Ir, and Pt and, the organic part is leachable; or Z Y' is a combination of a plurality of elements Y' as defined hereinabove.

In the case where Y' is H, C, N, O, F, Cl, P or S, or Y' is an organometallic compound, the leaching is carried out in a gaseous phase by thermal treatment or pyrolysis in the presence or not of another gas capable of reacting with Y' and forming another removable gas. Once again, some definitions of X' and Y' may overlap.

The invention and its advantages will be better understood upon reading the following non-restrictive, detailed description that follows, and the attached examples of reduction to practice.

DETAILED DESCRIPTION OF THE INVENTION

As previously explained, the process according to the invention comprises two steps.

The first one consists of preparing a metastable composite or alloy made of several chemical elements, whose structure is nanocrystalline and whose crystallites have a grain size lower than 100 nm. Therefore, the first step consists of preparing by a non-equilibrium process, a nanocrystalline alloy or nanocomposite having a nanometric microstructure.

From a practical standpoint, the preparation of this alloy or composite can be made in numerous manners.

Thus, the nanocrystalline material can be prepared by intense mechanical grinding. If the elements are highly soluble within each other, the resulting material will be a solid solution or nanocrystalline alloy. If the elements have a positive heat of mixing and therefore a low solubility within each other, the resulting material will be a nanocomposite whose elements will be finely intermixed.

This method of preparation of a material by intense mechanical griding is known and forms the subject matter of several patent applications filed with designation of the Applicant as co-owner. In this connection, reference can be made to the international and European laid-open patent applications referred to hereinabove in the preamble of the specification.

When the nanocrystalline material is produced by mechanical grinding, it is in the form of a powder. The preparation of this powder can be made in one or two steps. In the latter case, the nanocrystalline material can be prepared by subjecting the non-leachable element(s) to a first intense mechanical grinding until a nanocrystalline powder is obtained. Then, a leachable element can be mixed with the obtained powder and the resulting mixture can be subjected to a second intense mechanical grinding.

The nanocrystalline material can also be prepared by quenching (solidification from the liquid state), followed by a thermal treatment of the precursor material that was obtained, if this precursor material is not crystalline.

The nanocrystalline material can also be prepared by condensation in a vapor phase. This condensation can be carried out after evaporation in an inert gas, in order to form agglomerates that can be deposited. The condensation can also be carried out under vacuum by sputtering followed by the condensation of the vapor that was so produced onto a substrate.

In all cases, the only requirement is that the product that is so obtained has a nanocrystalline structure.

The second step of the method according to the invention consists of leaching at least one of the chemical elements of the nanocrystalline alloy previously prepared, in order to remove the chemical element and thus gives to the resulting material a porous structure and, thereby, a higher specific surface area. In this connection, one may understand that the size of the pores or asperities that are so-obtained is of a few nanometers, since the structure of the nanocrystalline materials which is subjected to the leaching is itself nanocrystalline.

From practical standpoint, such a leaching can be carried out in different manners: in a liquid phase, in a gaseous phase or by anodic polarisation. The leaching can be made partially or totally, depending on the intended use of the material that is prepared.

The leachable elements can be selected from the group consisting of Al, Mg, Zn, Li, Na, K, Ca, Zr, Ti, Mo or Zn. In such a case, the leaching is carried out in the liquid phase with an acid or a base selected so as to leach the leachable elements without leaching the other element(s) of the composite or alloy. Thus, for example, when the leachable element is Mg, the lixivation of this element can be carried out in the liquid phase with an acid, such as chlorhydric acid 1M. When the leachable element is Al, the leaching of this element can be carried out in the liquid phase with a base, such as NaOH 1M.

For other leachable elements present in the form of oxides, like $ZrO_2$ or $TiO_2$, the leaching can be carried out in the liquid phase with fluorhydric acid.

The leachable element can also be U. In such a case, the leaching can be carried out by anodic polarisation.

The leachable element can further be selected from the group consisting of H, C, N, O, F, Cl, P and S. In such a case, the leaching of this element can be carried out by thermal treatment in the presence or not of a gas capable of reacting with said element to form another gas and that can be removed. When the leachable element is C, a thermal treatment in ambient air will permit to C to be leached in the form of carbon dioxide while a thermal treatment in hydrogen will permit to C to be leached in the form of methane.

Instead of using one of the elements listed hereinabove, the leaching in a gaseous phase can also be carried out by using, as leachable element, an organometallic compound.

Use can also be made of a combination of several leachable elements.

Thus, the present invention permits to obtain in a very simple, flexible and easily scalable manner, a nanocrystalline material having a very high specific surface, making it particulary useful as a catalyst or electrocatalyst and/or for the production or storage of energy (fuel cells, hydrogen storage, etc.).

The invention can be used for the manufacture of electrolysis or electrocatalysis electrodes, such as, for example, the electrodes for the production of hydrogen, or the production of sodium chlorate, or the electrodes of fuel cells.

The invention can also be used for the manufacture of absorbing and/or adsorbing materials, which require a very high specific surface to be efficient, such as, for example, metal hydrides useful for storing hydrogen, porous materials, mesoporous materials, molecular sieves or filtration membranes.

When the nanocrystalline material according to the invention is intended to be used as catalyst or electrocatalyst, it is preferably obtained by a leaching of a nanocrystalline material in the form of a composite or alloy made of:

A—X—Y wherein:
- A is Pt, Ru or a Pt or Ru compound;
- X is at least one element selected from the group consisting of Ru, Ge, Si, W, Sn, Ga, As, Sb, Mo, Ti, Ta, Cr, Mn, Fe, Co, Ni, Cu, Rh, V, Pd, Ag, In, Os, Ir, Au, Pb, C, Cd, N, P, Bi, Nb and Zr; and
- Y is at least one element selected from the group consisting of Al, Mg, Zn, Li, Na, Ca, K, Ti, Zr, Mo, U and their oxides; or
- Y is at least one element selected from the group consisting of H, C, N, O, F, Cl, P and S; or
- Y is a combination of a plurality of elements Y as defined hereinabove.

As can be understood, Y is the leachable element.

When the nanocrystalline material according to the invention is intended to be used for storing hydrogen, it is preferably obtained by leaching a nanocrystalline material in the form of a composite or alloy made of:

A'—X'—Y' wherein:
- A' is Mg, Be or a Mg or Be compound;
- X' is at least one element selected from the group consisting of Li, Ca, Ti, V, Cr, Mn, Fe, Co, Ni, Cu, Zn, Y, Zr, Nb, Mo, In, Sn, O, Si, B and F; and
- Y' is at least one element selected from the group consisting of Al, Mg, Zn, Li, Na, K, Ca, Zr, Ti, Mo and their oxides; or
- Y' is at least one element selected from the group consisting of H, C, N, O, F, Cl, P and S; or
- Y' is an organometallic compound in which the metal is one of the metals listed in the definition of X' or a metal selected from the group consisting of Ru, Rh, Pd, Ir and Pt, and the organic part is leachable. This organometallic compound can be, for example, a phthalocyanine); or
- Y' is a combination of a plurality of elements Y' as defined hereinabove.

Once again, one may be understood that Y' is the leachable element.

For a practical standpoint, the amount of leachable element that is added to the other elements of the composite or alloy can vary within a very wide range. This amount is preferably selected so that the atomic percentage of the leachable element(s) within the composite or alloy be higher than 2% and lower than 95%. Preferably, the respective amounts of elements will be selected so as to reduce as much as possible the amount of element(s) to be leached.

Examples of use of the invention for the manufacture of electrodes for fuel cells and for storing hydrogen will now be given with reference to the appended drawings.

USE OF THE NANOCRYSTALLINE MATERIALS ACCORDING TO THE INVENTION IN FUEL CELLS

EXAMPLE 1

7.5 g of a mixture of commercial powders of Pt and Ru with an average composition $Pt_{50}Ru_{50}$ were subjected to an intensive mechanical grinding. Such grinding was carried out under argon for 40 h in a crucible made of WC with 3 balls made of WC using a grinder of trademark SPEX 8000®. The volume of the crucible was 70 ml and the weight of the balls was 30 g. 2 g of the ground powder were added to 3 g of Mg in another crucible of 70 ml, containing 2 WC balls made. A second grinding under argon was carried out for 10 h.

The so-obtained powder was then leached in chlorhydric acid 1M.

The material that was so-obtained was applied as a catalyst onto the anode of a fuel cell in a ratio of 4 mg/cm². The cathode of this fuel cell was made of ELAT® (0.37 mg Pt/cm² and 0.6 mg NAFION®/cm²).

Polarisation tests were carried out in the following operative conditions:

T cell: 80° C.

T water/anode: 110° C.

T water/cathode: 110° C.

$H_2$ pressure: 30 psi $O_2$ pressure: 60 psi

By way of comparison, tests were carried out under the same conditions, using a nanocrystalline alloy of PtRu prepared in the same manner by mechanical grinding for 40 h, but without the subsequent addition of Mg and leaching of the same.

Other tests were carried out with a catalyst of the type Pt Ru Ox sold under the trademark E-TEK®. This catalyst is known to be very efficient.

Figure 1:
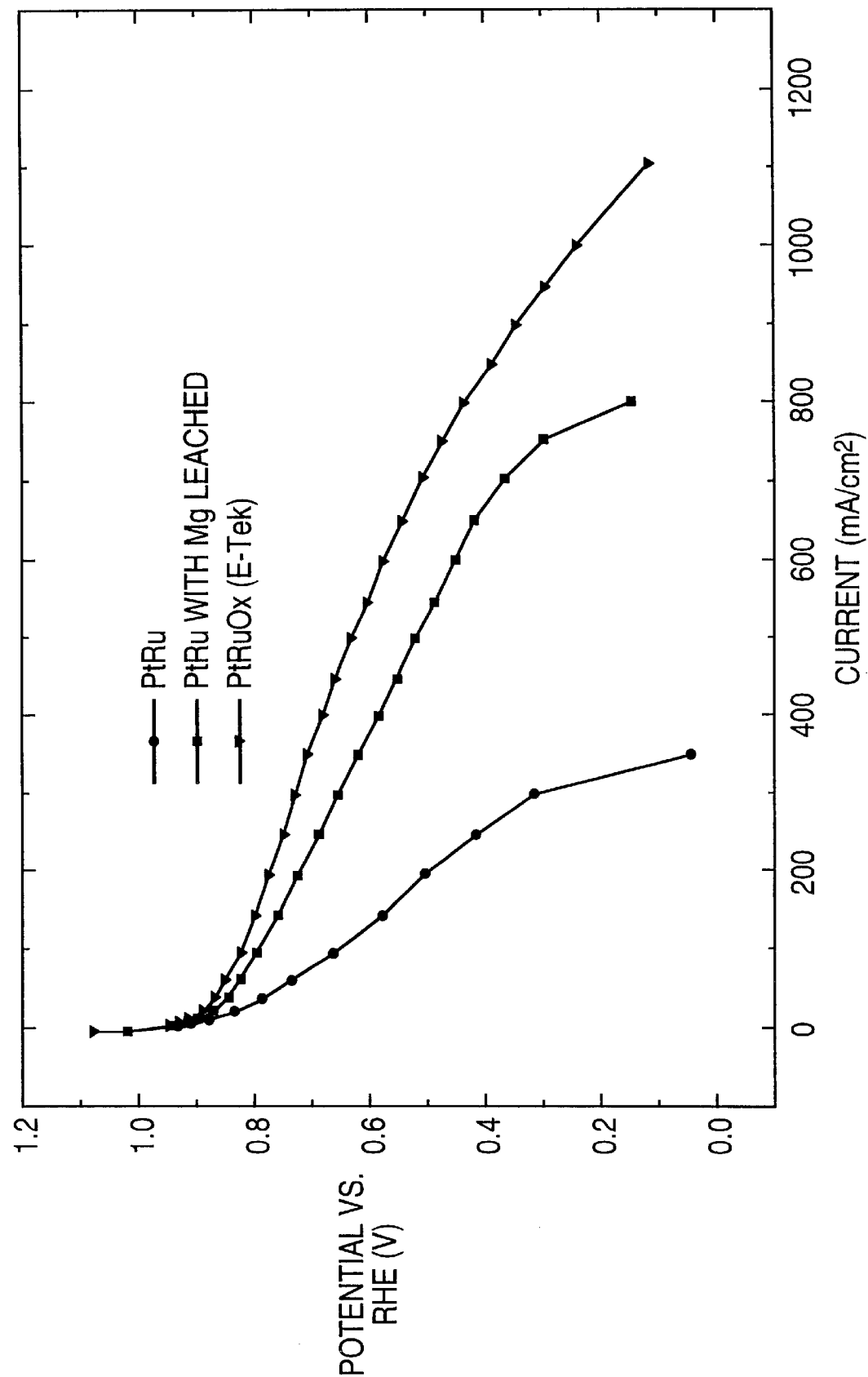
FIG. 1 are polarisation curves giving the value of the measured voltages as a function of the current density in a fuel cell provided with anodes respectively covered with a leached nanocrystalline material of the formula PtRu, a non-leached nanocrystalline alloy of the same formula PtRu, and a catalyst of trademark E-TEK®.

The polarisation curves that were so-obtained, giving the value of the voltage of the cell as a function of the current density are reported in FIG. 1. As can be seen, the nanocrystalline alloy of the formula PtRu is much more efficient when it is obtained with a subsequent leaching treatment (see curve ■). As a matter of fact, this efficiency is closest to the one of the product of trademark E-TEK® (see curve ▼) than it is from its non-leached "homolog" (see curve ●). Thus, by normalisation at 100% of the current density at 0,5 V of the commercial catalyst E-TEK® (PtRuOx), the activity of the leached PtRu material is 76% and the one of the non-leached PtRu which is 28%.

Figure 2:
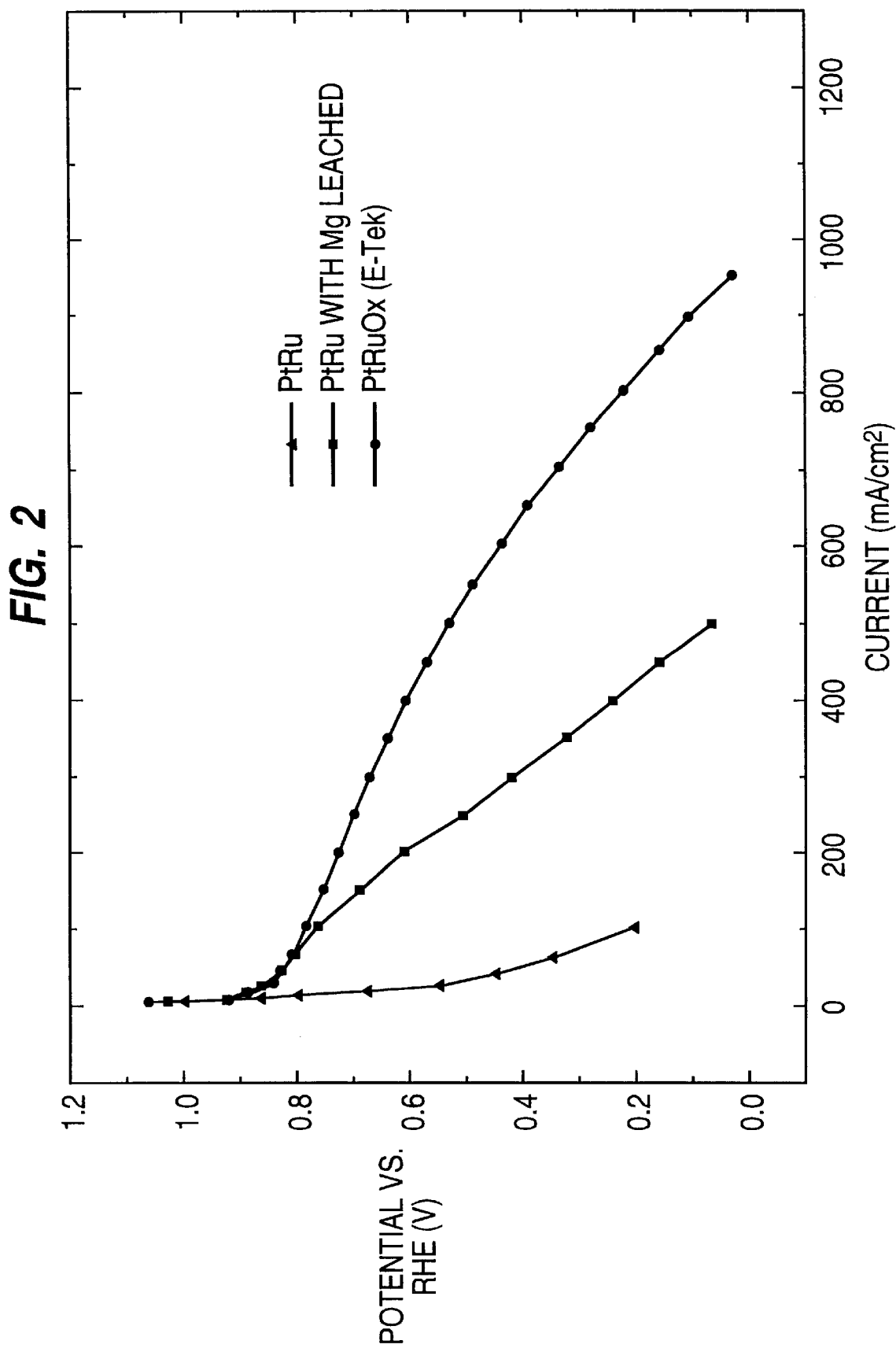
FIG. 2 are polarisation curves similar to those of FIG. 1, which were obtained under the same conditions but in the presence of carbon monoxide.

With the same anodes and under the same operating conditions, supplemental tests were carried out for determining the tolerance of these catalysts to carbon monoxide. For this purpose, 110 ppm of CO were added to the hydrogen. The polarisation curves that were obtained are reported in FIG. 2. By normalisation at 100% of the current density at 0.5 V of the commercial catalyst E-TEK®, the activity of the leached PtRu is 48%, and 6% for the non-leached PtRu.

EXAMPLE 2

Figure 3:
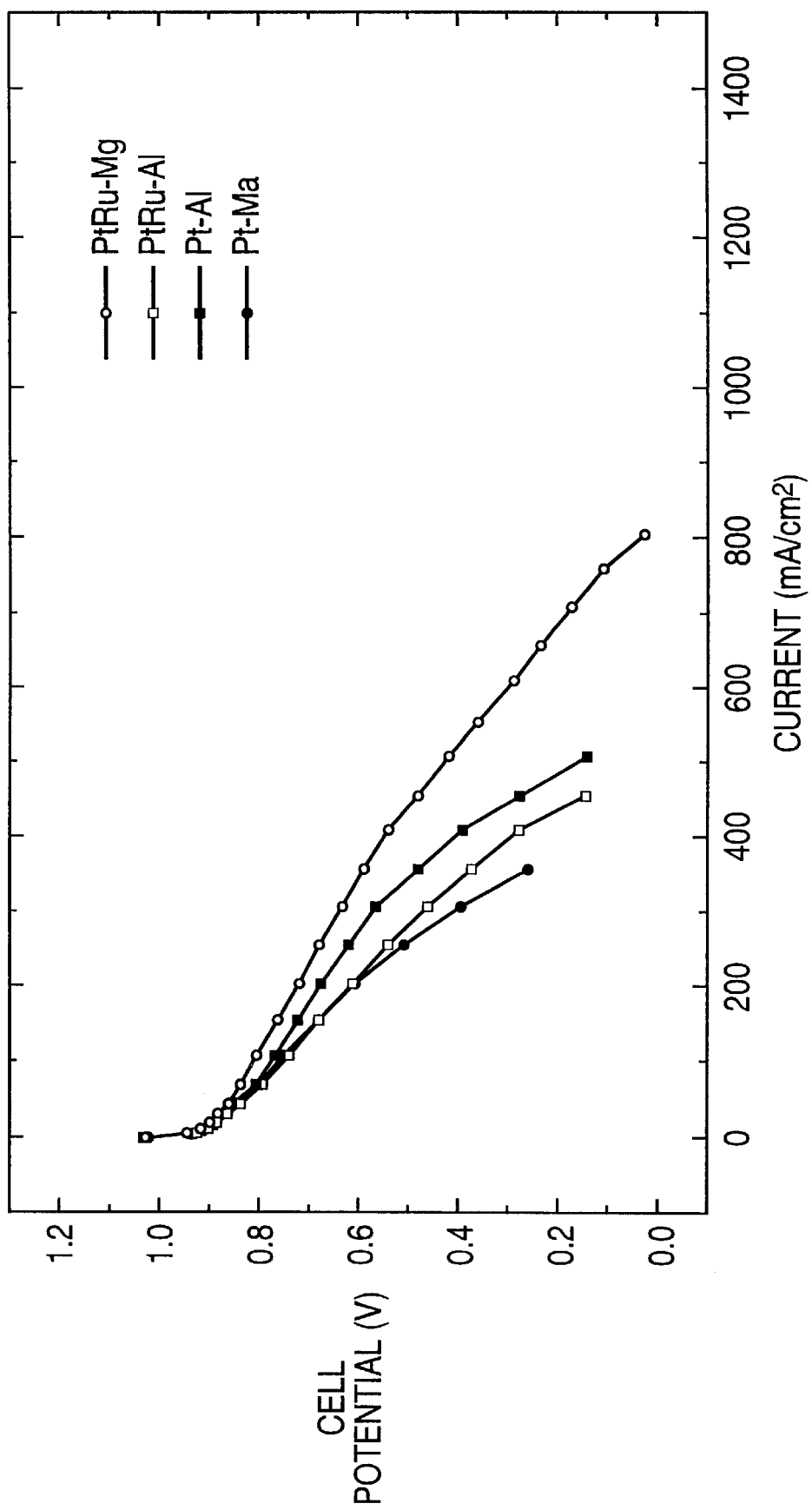
FIG. 3 are polarisation curves similar to those of FIG. 1, which were obtained under the same conditions but wherein the catalysts covering the anode were a leached nanocrystalline material of the formula PtRu and a leached material of the formula Pt, wherein the leached element is either Mg or Al.

By proceeding in the same manner and under the same conditions as previously but using a powder of pure Pt rather than a mixture of Pt and Ru powders, polarisation tests were carried out in a fuel cell. The results obtained with the leached nanocrystalline Pt that was so prepared and used as a catalyst on the anode are reported in FIG. 3 (see curve ●). By way of comparison, the results obtained with the leached PtRu alloy already reported in FIG. 1 are also reported in FIG. 2 (see curve ○).

EXAMPLE 3

7.5 g of a mixture of Pt and Al with an average composition $PtAl_4$, were subjected to grinding under argon for 40 h in a crucible made of WC with 3 balls also made of WC using a grinder SPEX 8000®. The weight ratio of the balls to the powder was 4:1.

After grinding, the powder was leached in NaOH 1M and the resulting material was applied as a catalyst onto the anode of a fuel cell similar to the one used in example 1, with a loading of 4 mg/cm².

Polarisation tests were carried out in the fuel cell under the same condition as in example 1. The results that were so-obtained are reported in FIG. 3 (see curve ■). It is interesting to note that the results that were so-obtained are similar eventhough slightly higher than those obtained with the material of example 2, where the leached element was Mg instead of Al (see curve ●).

EXAMPLE 4

By proceeding in the same manner and under the same conditions as in example 3 but using a mixture of Pt and Ru for obtaining a final mixture of the formula $Pt_{0.5}Ru_{0.5}Al_4$, polarisation tests were carried out in the fuel cell. The results that were so obtained are reported in FIG. 3 (see curve □).

EXAMPLE 5

By proceeding in the very same manner and under the same conditions as in example 1, but by replacing Ru successively by Ge, Si, W and Sn in the same atomic ratio 50/50, polarisation tests were carried out in the fuel cell. The only differences during this example were that:

in the case of the material containing Si, W and Sn, the second grinding lasted 20 hours instead of 10 hours; and in the case of the material containing Sn, the leaching of Mg was carried out in a mixture of acetic acid 1M and methanol instead of being carried out in a chlorydric acid solution.

Figure 4:
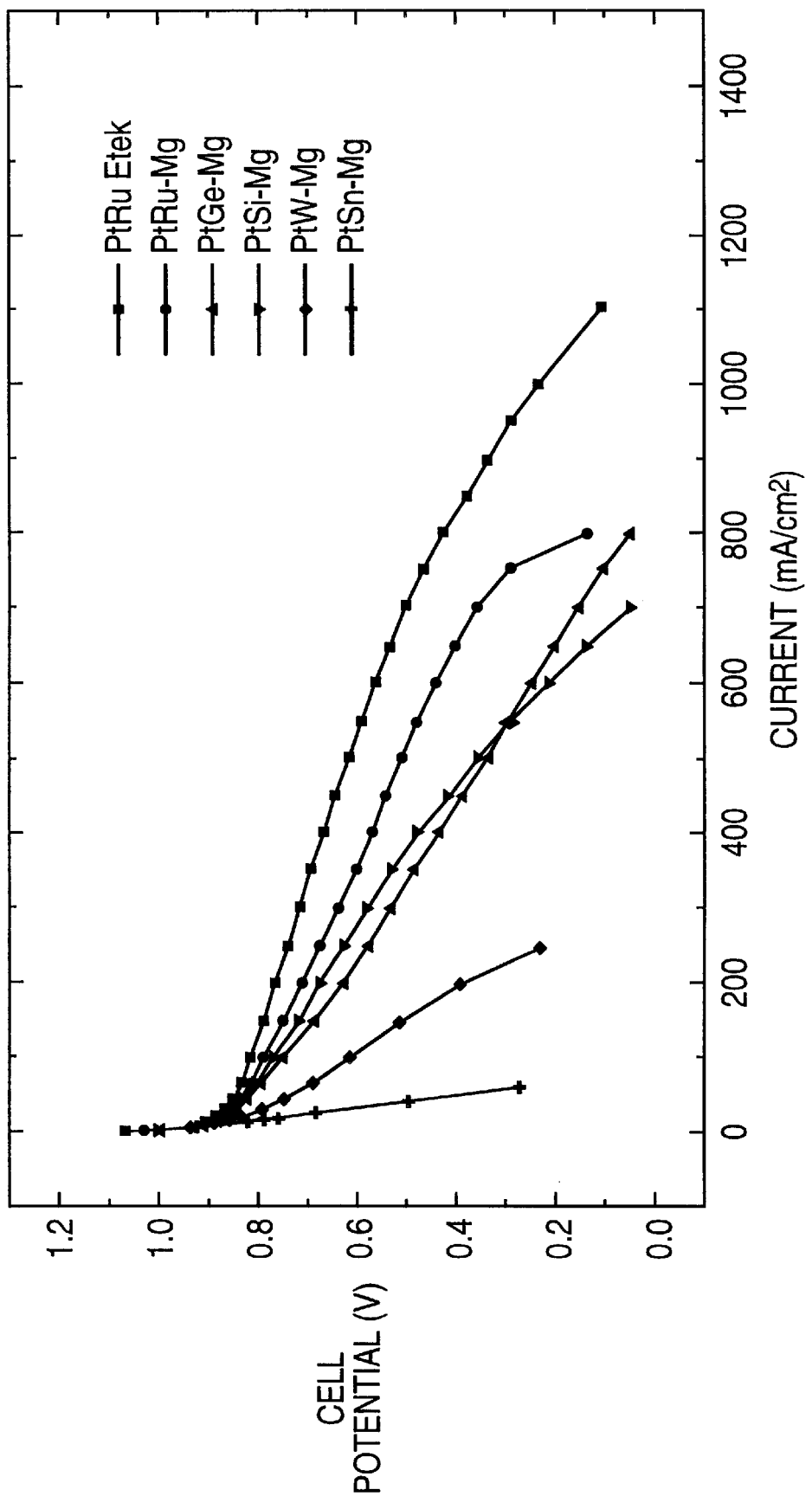
FIG. 4 are polarisation curves similar to those of FIG. 1, which curves were obtained under the same conditions, but wherein the catalyst covering the anodes were leached nanocrystalline materials of formula PtRu, PtGe, PtSi, PtW and PtSn.

The results that were so-obtained are reported in FIG. 4. By way of comparison, the results obtained with the catalyst E-TEK® (PtRuOx) and those obtained with the leached nanocrystalline material PtRu-Mg prepared in example 1 are also reported.

By normalisation at 100% of the current density at 0,5 V of the commercial catalyst E-TEK®, it can be noted that the activities of the materials that were so tested are as follows:

leached PtRu-Mg (curve ■) 76% leached PtGe-Mg (curve ▲) 55% leached PtSi-Mg (curve ▼) 49% leached PtW-Mg (curve ♦) 23% leached PtSn-Mg (curve l) 6%

Figure 5:
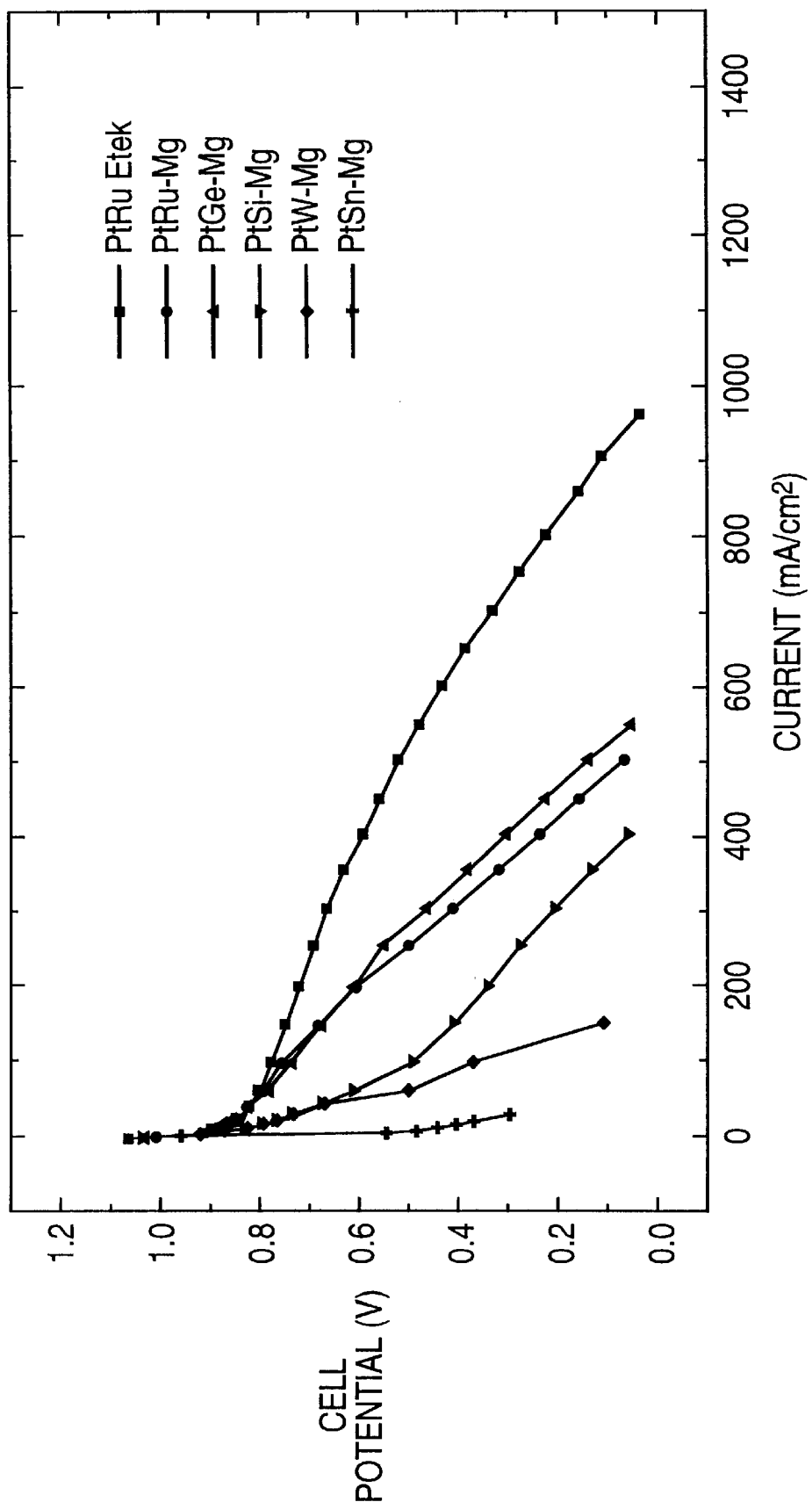
FIG. 5 are polarisation curves similar to those of FIG. 4, which were obtained under the same conditions but in the presence of carbon monoxide.

With the same anodes and under the same operative conditions, supplemental tests were carried out for determining the tolerance of these catalysts to carbon monoxide. For this purpose, 110 ppm of CO were added to the hydrogen. The polarisation curves that were so obtained are given in FIG. 5. By normalisation at 100% of the current density at 0.5 V of the commercial catalyst E-TEK®, the activity of the tested materials were as follows:

leached PtRu-Mg (curve ■) 48% leached PtGe-Mg (curve ▲) 35%

Leached PtSi-Mg (curve ▼) 20% leached PtW-Mg (curve ♦) 13% leached PtSn-Mg (curve l) 2%

EXAMPLE 6

A mixture of 2.21 g of a powder of $PtCl_2$ and 4.79 g of a powder of $Al_4C_3$ corresponding to an average composition $(PtCl_2)_{0.2} (Al_4C_3)_{0.8}$ was subjected to an intensive mechanical grinding under argon for 40 h in a crucible made of WC with 3 balls made of WC, using a grinder of trademark SPEX 8000®. The weight ratio of the balls to the mixture of powders (7 g) was equal to about 4:1.

The nanocrystalline compound that was so obtained was introduced very slowly into a becher filled with water under inert atmosphere (this slow introduction of the nanocrystalline compound into water is required, because $Al_4C_3$ reacts in an exothermic way with water and forms hydrocarbons that can be inflammated and exploded). NaOH was then added under mechanical stirring so as to reach a concentration of 1M.

The leached product that was so obtained, was then extracted, rinsed and dried.

This product was applied as a catalyst onto the anode of a fuel cell similar to the one disclosed in example 1, with a loading of 4 mg/cm$^2$. The cathode was made of ELAT® and the operative conditions were identical to those originally disclosed.

Another test was carried out in the presence of 110 ppm of CO.

Comparative tests were also carried out with and without CO using, for comparison purpose, a catalyst of the formula PtRuOx (E-TEK®).

Figure 6:
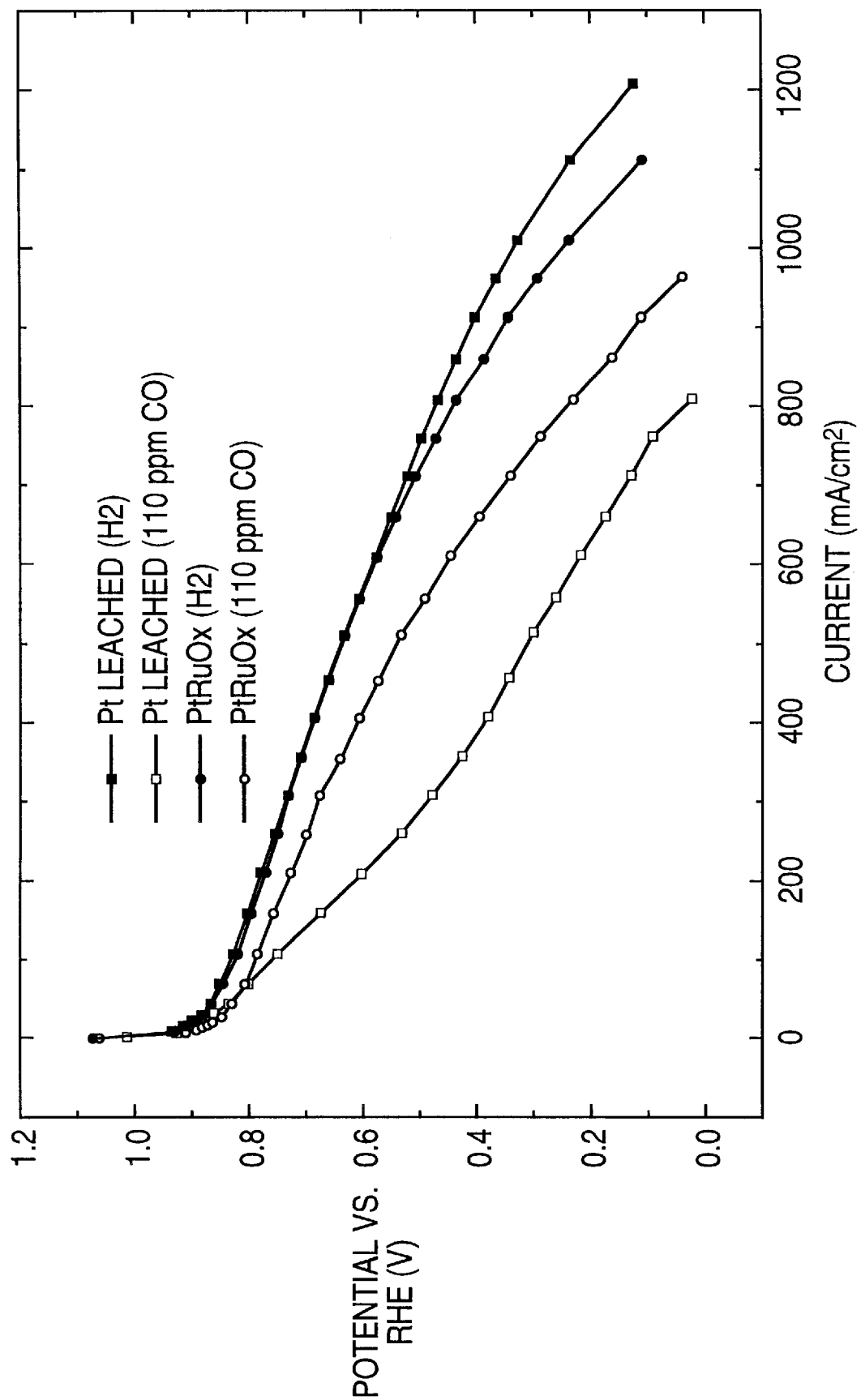
FIG. 6 are polarisation curves similar to those of FIG. 1, which were obtained under the same conditions but wherein the catalysts covering the anode were nanocrystalline Pt obtained by leaching of a nanocrystalline composite of the formula $(PtCl_2)_{0.2}(Al_4C_3)_{0.8}$, and a catalyst of trademark E-TEK®, without and with carbon monoxide.

The polarisation curves that were so obtained are reported in FIG. 6.

USE OF THE NANOCRYSTALLINE MATERIALS ACCORDING TO THE INVENTION FOR STORING HYDROGEN

EXAMPLE 7

Part (a) comparison

This test was carried out in a grinder SPEX 8000® with a steel crucible of 55 ml, in which two steel balls having a diameter of ½ inch and a third steel balls having a diameter of 9/16 inch were inserted. The total weight of the steel balls was equal to 28.680 g. A stoichiometric mixture of 2 Mg+Ni of a total weight of 3.158 g was inserted into the crucible. The mixture was ground under argon for 150 hours. An intermetallic nanocrystalline alloy of the formula Mg$_2$Ni was formed and such was confirmed by X-ray diffraction.

Figure 7:
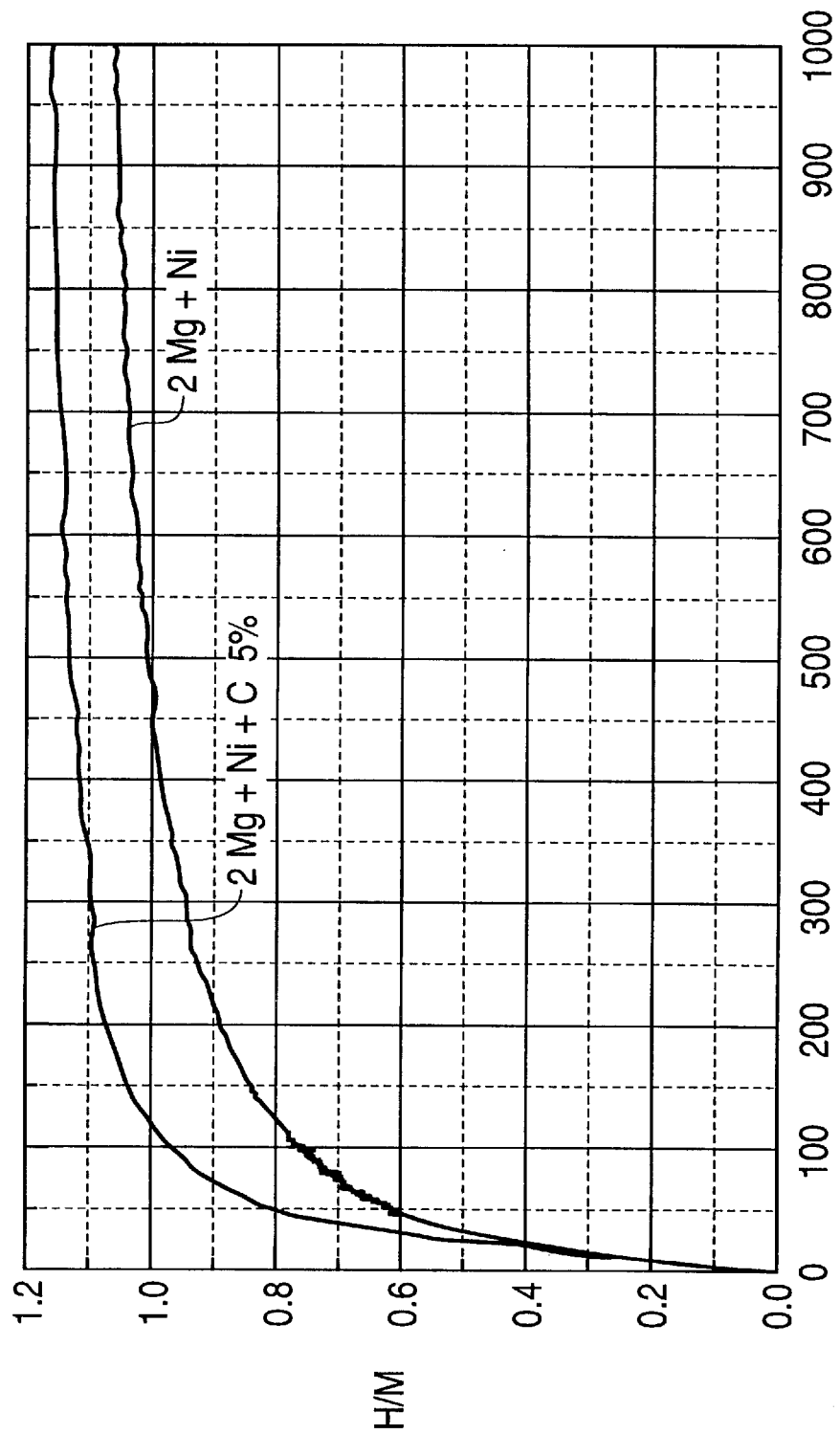
FIG. 7 are the hydrogen absorption curves as a function of time (expressed in seconds), for a nanocrystalline alloy of formula $Mg_2Ni$ and a nanocrystalline alloy of the very same formula containing a small amount of C, a part of which was leached.

The hydrogen absorption kinetic was then measured with a hydrogen titration system. FIG. 7 shows the hydrogen absorption curve at 300° C. under a pressure of 200 psi, after one cycle of absorption/desorption.

Part (b) invention

By using the same equipment as in part (a) and the same mixture with an addition of 5% by weight of graphite, a nanocrystalline alloy was prepared. In such case, the grinding was carried out at 200° C. for 8 hours.

FIG. 7 shows the absorption speed of the nanocrystalline powder that was obtained at 300° C. under pressure 200 psi after a cycle of absorption/desorption. As can be seen, the absorption kinetics is much higher than the one obtained in part (a), eventhough the grinding was shorter (but carried out at elevated temperature).

This can be explained as follows. After grinding, the proportion of carbon measured into the material was equal to 5.2% by weight. After several cycles of hydrogen absorption/desorption, the percentage of carbon was down to 3.7% by weight. This difference could be explained by the fact that, during the successive cycles of absorption/desorption at elevated temperature, a part of the carbon present in the original material has been leached probably in the form of methane CH$_4$. This leaching increases the specific surface of the alloy and, thereby, its efficiency (FIG. 7 is particularly illustrative of this increase in the absorption kinetics).

EXAMPLE 8

By proceeding as in example 6, a nanocrystalline alloy of the formula MgLi 10% by weight was prepared. To do so, use was made as starting materials of 3.3 g of Mg and 0.331 g of Li.

The mixture was ground for 50 hours. The obtained powder was leached in distilled water under magnetic and ultrasonic steering.

The specific surfaces of the powder that were obtained before and after leaching were measured. The specific surfaces that were so measured were as follows:

before leaching: 1.1118 m$^2$/g after leaching: 11.4688 m$^2$/g

Figure 8A:
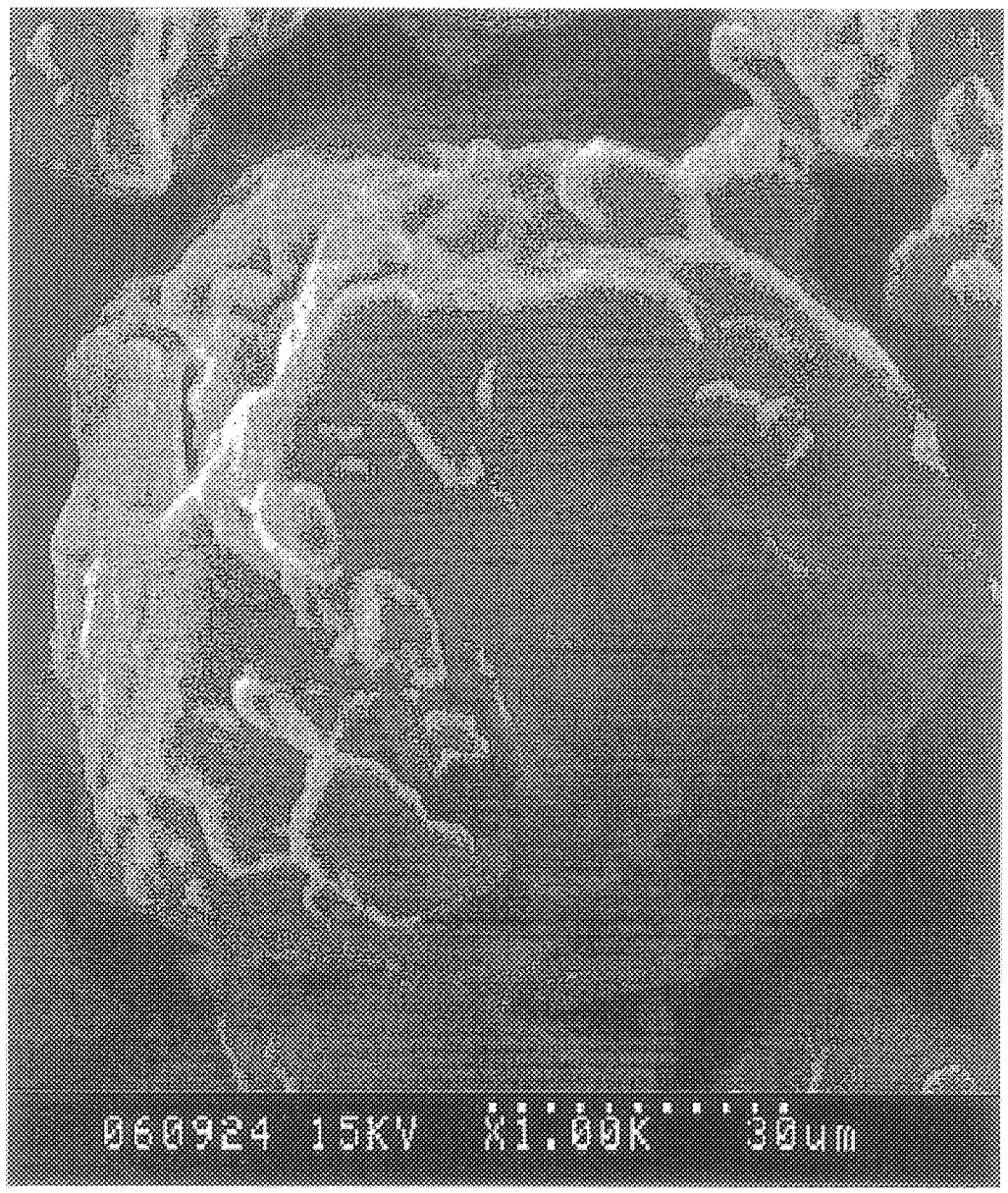
FIGS. 8a and 8b are photographs of nanocrystalline particles of the formula MgLi 10% by weight, taken before and after leaching of Li, respectively.
Figure 8B:

The morphology of the particles that were obtained before and after leaching is shown in FIGS. 8a and 8b. As can be seen, the leaching substantially increases the specific surface and as was shown in example 6, the efficiency of the material for storing hydrogen.

Figure 9:
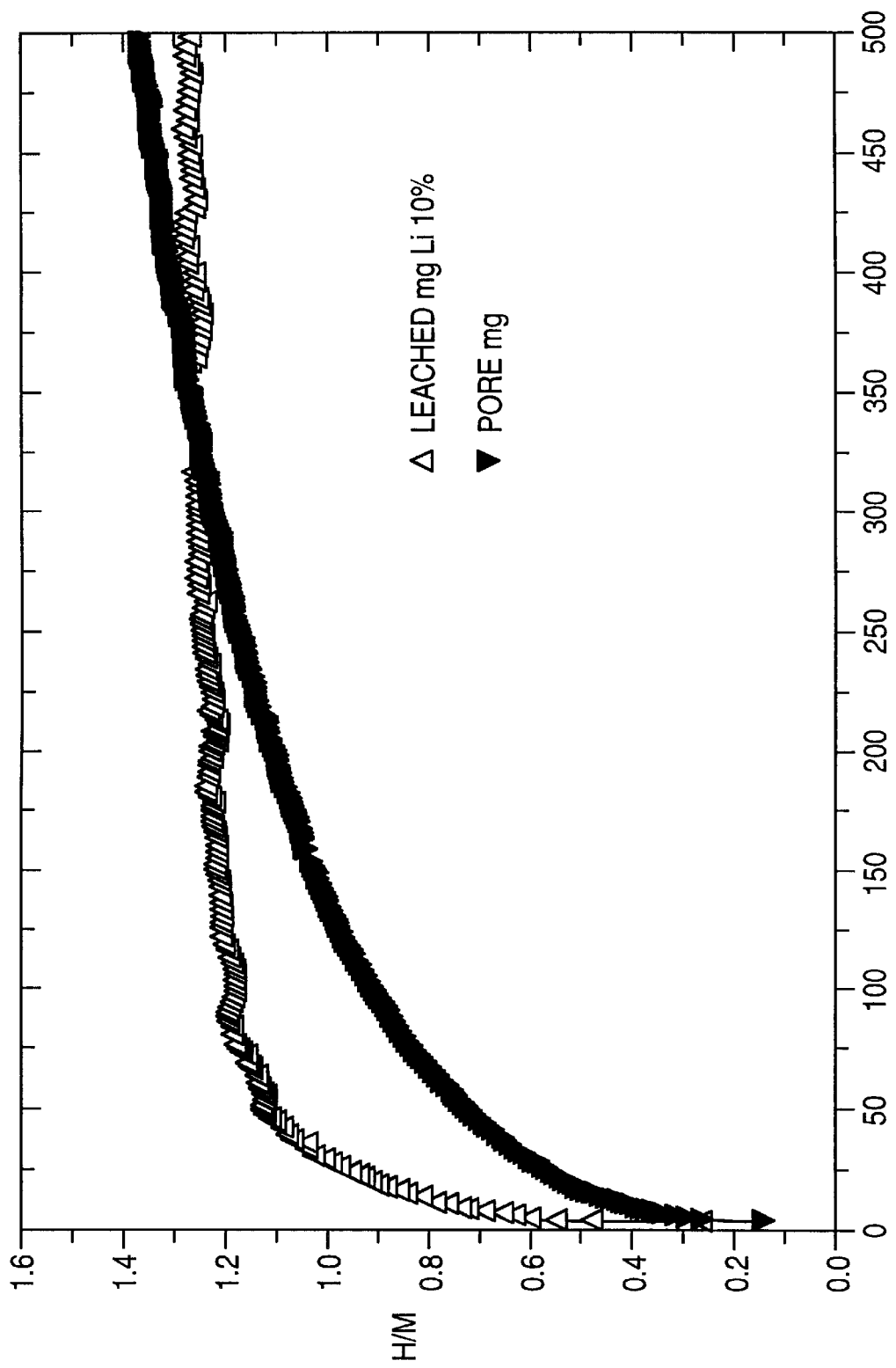
FIG. 9 are curves giving the hydrogen absorption ratio as a function of time (expressed in seconds), for nanocrystalline Mg obtained as such and by leaching of a nanocrystalline MgLi 10% mixture.

FIG. 9 shows the absorption rate of the nanocrystalline powder that was so obtained after leaching (curve ▲, as compared to a nanocrystalline powder of Mg obtained directly, viz. without addition of Li and subsequent leaching (curve ▼). This measurement was made at 400° C. under a pressure of 36 bars. As can be seen, the absorption kinetics of the leached Mg powder is much higher than the one of the corresponding, non-leached Mg powder.

What is claimed is:

1. A process for the manufacture of a nanocrystalline material having a specific surface area equal to or higher than 2 m$^2$/g, comprising the steps of:

(1) preparing a nanocrystalline material consisting of a metastable composite or alloy of at least two different chemical elements, said material having a nanocrystalline structure with a grain size lower than 100 nm; and (2) subjecting said nanocrystalline material to a leaching treatment in order to eliminate partially or totally at least one of the elements of the composite or alloy, said leaching producing a nanocrystalline material having a porous structure , with a specific surface area equal to or higher than 2 m$^2$/g.

2. The process of claim 1 wherein:

said at least one element leached in the second step is selected from the group consisting of Al, Mg, Li, Na, K, Ca, Zr, Ti, Mo and Zn; and the leaching treatment of said at least one element is carried out in a liquid phase with an acid or a base selected to leach said element without leaching the other elements of the composite or alloy.

3. The process of claim 1, wherein:

the element leached in the second step is Mg; and the leaching treatment of said element is carried out in a liquid phase with an acid.

4. The process of claim 2, wherein:

the element leached in the second step is Al; and the leaching treatment of said element is carried out in a liquid phase with a base.

5. The process of claim 2, wherein:

the element leached in the second step is Zr in the form of ZrO$_2$; and the leaching treatment of said element is carried out in a liquid phase with fluorhydric acid.

6. The process of claim 1, wherein:

the element leached in the second step is U; and the leaching treatment of said element is carried out by anodic polarization.

7. The process of claim 1, wherein:

said at least one element leached in the second step is selected from the group consisting of H, C, N, O, F, Cl, P and S; and the leaching treatment of said at least one element is carried out by thermal treatment in the optional presence of a gas that reacts with said at least one element in order to form another gas.

8. The process of claim 1, wherein:

said at least one element leached in the second step is selected from the group consisting of Al, Mg, Li, Na, K, Ca, Ti, Zr, Mo, Zn and their oxides and H, C, N, O, F, Cl, P and S; and the leaching treatment of said at least one element is carried out by at least one treatment selected from the group consisting of:
 a treatment in the liquid phase with an acid or a base;
 a thermal treatment in the optional presence of a gas that reacts with said at least one element to form another gas; and
 the combination of both of said treatments.

9. The process of claim 1, wherein:

in the first step, the nanocrystalline material that is prepared consists of an alloy or a composite incorporating an organometallic component including a metal and an organic group; and in the second step, the organic group contained in the organometallic component is leached by subjecting the nanocrystalline material to a thermal treatment in the optional presence of a gas that reacts with said organic group in order to form another gas, said organic group acting as said element to be leached.

10. The process of claim 1, wherein:

in the first step, the nanocrystalline alloy is prepared in the form of a powder by intense mechanical grinding.

11. The process of claim 10, wherein:

in the first step, the nanocrystalline material is prepared by subjecting said at least one element of the material to a first intense mechanical grinding until a nanocrystalline powder is obtained, by adding said at least one element to be leached to said powder to form a mixture, and by subjecting said mixture to a second intense mechanical grinding.

12. The process of claim 1, wherein:

in the first step, the nanocrystalline material is prepared by quenching followed, if the material is amorphous, by crystallization.

13. The process of claim 1, wherein:

in the first step, the nanocrystalline material is prepared by vapor phase condensation.

14. The process of claim 1, wherein:

in the first step, the element to be leached is combined with said at least one other element of the composite or alloy in such an amount that the atomic percentage of said element to be leached within said composite or alloy ranges between 2% and 95%.

15. A nanocrystalline material having a crystalline structure with a grain size lower than 100 nm and a specific surface area equal to or higher than 2 $m^2/g$, wherein said material is prepared by a process as claimed in claim 1.

16. A nanocrystalline material having a crystalline structure with a grain size lower than 100 nm and a specific surface equal area or higher than 2 $m^2/g$, wherein said material is prepared by a process as claimed in claim 11.

17. A method of storing hydrogen, comprising the steps of absorbing said hydrogen into a nanocrystalline material as claimed in claim 15, comprising at least one chemical element or compound known to absorb hydrogen in a reversible manner.

18. A method of manufacture of a catalysis or electrocatalysis electrode, comprising the steps of applying onto a support a nanocrystalline material as claimed in claim 15.

19. A nanocrystalline material useful as an intermediate for the manufacture of a nanocrystalline material having a specific surface area equal to or higher than 2 $m^2/g$, which is itself useful for the manufacture of electrodes, said intermediate having a nanocrystalline structure with a grain size lower than 100 nm and being in the form of a composite or alloy made of:

$$A—X—Y$$

wherein:

A is Pt, Ru or a Pt or Ru compound;

X is at least one element selected from the group consisting of Ru, Ge, Si, W, Sn, Ga, As, Sb, Mo, Ti, Ta, Cr, Mn, Fe, Co, Ni, Cu, Rh, V, Pd, Ag, In, Os, Ir, Au, Pb, C, Cd, N, P, Bi, Nb and Zr; and Y is at least one element selected from the group consisting of Al, Mg, Zn, Li, Na, K, Ca, Ti, Zr, Mo and U; or Y is at least one element selected from the group consisting of H, C, N, O, F, Cl, P and S; or Y is a combination of a plurality of elements Y as defined hereinabove.

20. A nanocrystalline material useful as an intermediate for the manufacture of a nanocrystalline material having a specific surface equal to higher than 2 $m^2/g$, which is itself useful for storing hydrogen, said intermediate having a nanocrystalline structure with a grain size lower than 100 nm and being in the form of a composite or alloy made of:

$$A'—X'—Y'$$

wherein:

A' is Mg, Be or a Mg or Be compound;

X' is at least one element selected from the group consisting of Li, Ca, Ti, V, Cr, Mn, Fe, Co, Ni, Cu, Zn, Y, Zr, Nb, Mo, In, Sn, O, Si, B and F; and Y' is at least one element selected from the group consisting of Al, Mg, Zn, Li, Na, K, Ca, Ti, Zr and Mo; or Y' is at least one element selected from the group consisting of H, C, N, O, F, Cl, P, and S; or Y' is an organometallic compound in which the metallic element is one of the metals listed in the definition of X' or a metal selected from the group consisting of Ru, Rh, Pd, Ir, and Pt; or Y' is a combination of a plurality of element Y' as defined hereinabove.

* * * * *